United States Patent [19]
Balthazard

[11] Patent Number: 5,946,938
[45] Date of Patent: Sep. 7, 1999

[54] CONDENSER WITH A SEPARATE RESERVOIR FOR AN AIR CONDITIONING INSTALLATION, ESPECIALLY FOR MOTOR VEHICLES

[75] Inventor: Patrick Balthazard, Guignicourt, France

[73] Assignee: Valeo Thermique Moteur, La Verriere, France

[21] Appl. No.: 08/869,812

[22] Filed: Jun. 5, 1997

[30] Foreign Application Priority Data

Jun. 5, 1996 [FR] France .................................. 96.06931

[51] Int. Cl.$^6$ ........................................................ F25B 39/04
[52] U.S. Cl. ................................................ 62/507; 62/509
[58] Field of Search ................... 62/507, 509; 165/132, 165/173, 174

[56] References Cited

U.S. PATENT DOCUMENTS

| | | | |
|---|---|---|---|
| 4,492,267 | 1/1985 | Cadars | 165/104.32 |
| 5,159,821 | 11/1992 | Nakamura | 62/509 |
| 5,228,315 | 7/1993 | Nagasaka et al. | 62/509 |
| 5,341,872 | 8/1994 | Mercurio | 165/173 |
| 5,537,839 | 7/1996 | Burk et al. | 62/474 |
| 5,546,761 | 8/1996 | Matsuo et al. | 62/509 |
| 5,592,830 | 1/1997 | Baba et al. | 62/509 |
| 5,628,206 | 5/1997 | Baba | 62/507 |

FOREIGN PATENT DOCUMENTS

| | | |
|---|---|---|
| 2 499 704 | 8/1982 | France . |
| 42 38 853 | 5/1994 | Germany . |
| 44 02 927 | 8/1995 | Germany . |
| 82/04307 | 4/1982 | WIPO . |

OTHER PUBLICATIONS

Patent Abstracts of Japan vol. 9, No. 57 (M–363), 13 Mar. 1985 & JP 59 191894 A (Hitachi, Oct. 31, 1984.
French Search Report dated Feb. 28, 1997.

*Primary Examiner*—William E. Tapolcai
*Attorney, Agent, or Firm*—Morgan & Finnegan, LLP

[57] ABSTRACT

A condenser for a motor vehicle air conditioning system, through which a refrigerant fluid flows, comprises a bundle of tubes fitted between two vertical headers, together with a separate reservoir which is installed vertically close to one of the headers. The walls which define the reservoir and associated header have respective vertical passages in the form of slots, each extending over the whole height of the condenser or header. A metal connecting plate has a first longitudinal edge portion and a second longitudinal edge portion, which are received in the respective slots in such a way that the two walls are immobilized against each other in the region of these passages. The connecting plate has at least one cut-out portion or bight through which the refrigerant fluid can flow between the header and the reservoir at a selected location.

14 Claims, 2 Drawing Sheets

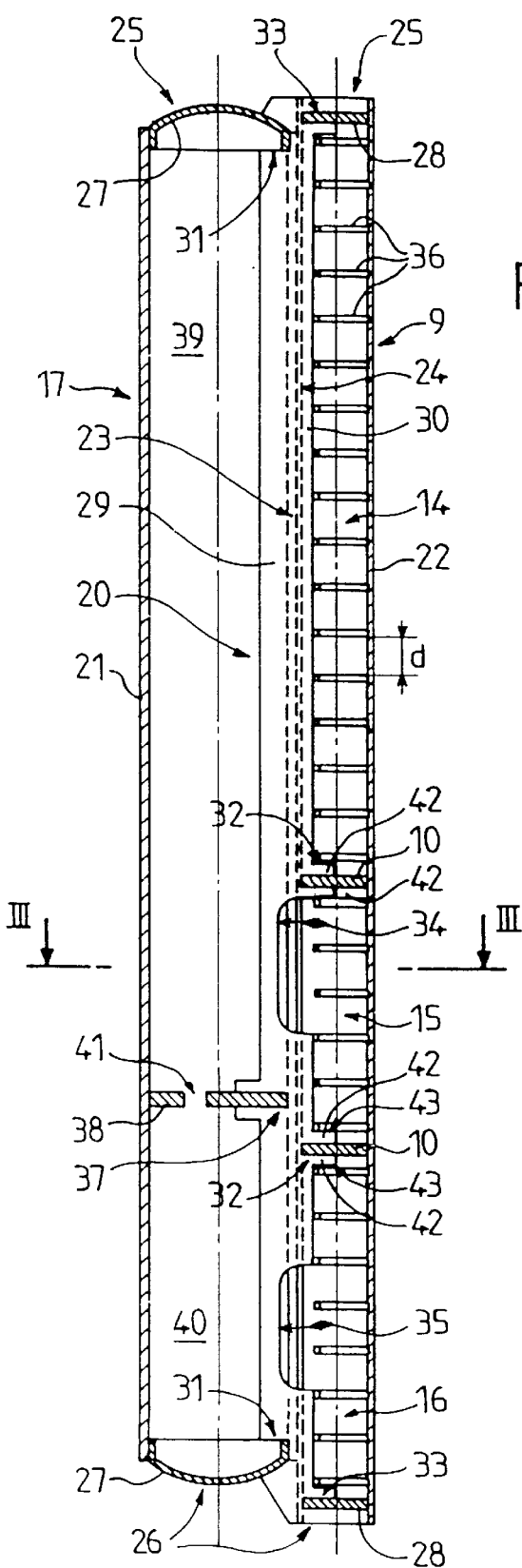
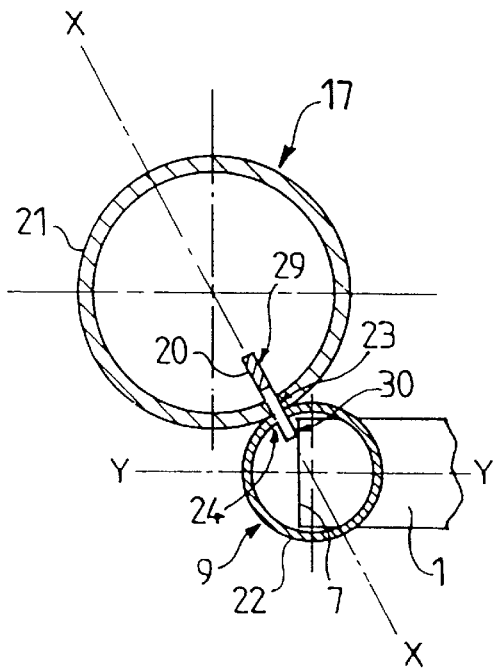
FIG. 2
FIG. 3

CONDENSER WITH A SEPARATE RESERVOIR FOR AN AIR CONDITIONING INSTALLATION, ESPECIALLY FOR MOTOR VEHICLES

FIELD OF THE INVENTION

This invention relates to condensers for refrigerating circuits, and in particular to condensers with separate reservoirs for inclusion in air conditioning installations, especially for motor vehicles. More precisely, the invention relates to a condenser of this type which comprises a multiplicity of tubes constituting a tube bundle mounted between a first header and a second header defined by a header wall extending in a substantially vertical direction, the separate reservoir of the condenser being defined by a generally tubular reservoir wall which extends substantially vertically and which is fitted close to the second header.

BACKGROUND OF THE INVENTION

In general terms, in condensers of the type having a separate reservoir, the second header is a component which is a pressing made from metal plate, while the reservoir consists of an extruded profiled tube. The reservoir and the second header each have an orifice into which one of the ends of a connecting duct is introduced. The formation of such an orifice in the profiled extruded tube requires considerable care, because of the undesirability of allowing this tube to be deformed in any way, especially in the region of the latter in which the orifice is formed. The need to take special care tends to increase manufacturing costs. In addition, the operation of ensuring proper sealing between the ends of the connecting duct and the walls of the header and reservoir into which these duct ends are introduced makes it necessary to perform particular operations, which adds still more to the manufacturing costs of such condensers.

DISCUSSION OF THE INVENTION

One object of the invention is accordingly to provide a condenser with a separate reservoir which does not have the above mentioned drawbacks.

According to the invention, a condenser, in particular for a refrigerating circuit through which a refrigerant fluid flows, the condenser being of the type comprising a multiplicity of tubes constituting a tube bundle mounted between a first header and a second header, each header being defined by a header wall extending in a substantially vertical direction, and a separate reservoir which is defined by a reservoir wall extending substantially vertically and mounted close to the second header, is characterised in that the said reservoir wall is formed with a first passage extending vertically over the height of the reservoir, and the said header wall of the second header has a second passage extending vertically over the height of the second header, and in that the condenser further includes a metallic connecting member comprising a first longitudinal edge portion and a second longitudinal edge portion, extending respectively over at least the heights of the reservoir and second header, the said first edge portion being adapted to be introduced into the said first passage and the said second edge portion being adapted to be introduced into the said second passage, so as to immobilise the reservoir wall and the header wall of the second header against each other in the region of the said passages, the said connecting member having, in at least one selected position, a bight for enabling refrigerant fluid to flow between the second header and the reservoir, with the said first edge portion and the said second edge portion of the connecting member obturating the said first and second passages respectively except at the said bight or bights.

In this way, during the operation of assembling the condenser, and before it has been sealed, for example by welding, or by introduction into a brazing oven, the reservoir and the second header are secured to each other by the metal connecting member, the longitudinal edge portions of which are introduced into the respective passages of the reservoir and second header. Insofar as the bight (or each bight) formed in the connecting member puts the respective passages of the second header and reservoir into direct communication with each other, it is accordingly no longer necessary to make use of a connecting duct to allow refrigerant fluid to flow between the reservoir and the second header.

According to a preferred feature of the invention, the two said walls of the reservoir and second header respectively are in the form of cylinders formed from metal plate, each said cylinder having an upper end and a lower end which is closed off by a respective end closure member. The operations of configuring the reservoir and the second header may consist simply of rolling each metal plate blank in order to give it the required form.

In a preferred embodiment of the invention, each longitudinal edge portion of the connecting member includes, in upper and lower parts of the connecting member, openings of selected form for enabling at least the corresponding end closure members to be fitted therein, that each of the latter closes off the space delimited by the said wall that has the said passage into which the edge portion concerned is introduced.

According to another preferred feature of the invention, at least one of the longitudinal edge portions of the connecting member supports, in at least one predetermined zone, an intermediate partition whereby to define chambers in the space delimited by the said wall that has the said passage into which the edge portion concerned is introduced.

The or each said intermediate partition is preferably in the form of a metal plate fitted into, and supported by, an opening formed in the corresponding said predetermined zone. Accordingly, each intermediate partition which is to be fitted in the reservoir and or in the second header is fitted beforehand onto the connecting member. This considerably simplifies the fitting operation, in that it is no longer necessary to provide means for fastening the intermediate partitions into the reservoir and/or the second header.

Each of the said bights is preferably formed (in the appropriately selected location) in the second longitudinal edge portion of the connecting member.

Where the condenser is of the multipass type, the said second longitudinal edge portion of the connecting member is preferably formed with two said bights in a selected first location and second location respectively, and supports two metal intermediate partitions in a predetermined first zone and second zone respectively. With this arrangement, three chambers are defined within the second header, two of which communicate with the reservoir through the bights, to enable refrigerant fluid to enter the reservoir before passing into a lower part of the condenser after having being treated, if desired, in the reservoir.

In addition, in a preferred arrangement of this type of multi-pass condenser, the end closure members closing off the wall of the second header are in the form of metal plates substantially identical with the intermediate partitions, the said end closure members being fitted in openings formed in the upper and lower parts of the second longitudinal edge portion of the connecting member, and the end closure members closing off the reservoir are in the form of configured metal plates, each having a convex face oriented towards the interior of the reservoir and arranged to be fitted in notches formed in the upper and lower parts of the first longitudinal edge portion of the connecting member.

In this particular embodiment, the end closure members of the reservoir and the second header are, like the intermediate partitions, fastened by being intimately fitted to the connecting member, even before the first and second longitudinal edge portions of the connecting member have been introduced into the first and second passages in the respective walls of the reservoir and second header.

Preferably, the first longitudinal edge portion of the connecting member includes, in a predetermined zone lying between the said two selected locations at which the two said bights are formed, an opening for supporting an intermediate partition fitted therein so as to divide the reservoir into two chambers, the said intermediate partition of the reservoir having a through hole, preferably formed centrally, for passage of refrigerant fluid between the two chambers of the reservoir. In this case, where the reservoir has two chambers, the upper chamber can be used for containing desiccating means and, if desired, a filter, for treating the refrigerant fluid. This fluid generally contains water and impurities, which are detrimental to proper performance of the refrigerating circuit in which the condenser is installed.

According to a further preferred feature of the invention, the wall of the second header is formed with a set of calibrated slots one above the other, in each of which the end of a respective one of the tubes in the tube bundle is received. These calibrated slots can be punched out of the flat metal blank before the latter is configured into cylindrical form so as to form the wall of the header. The second longitudinal edge portion of the connecting member then constitutes an end abutment for the ends of the tubes, except over that part of the length of the edge of the second edge portion which is formed with a bight or opening as discussed above. In this way, at least a majority of the tubes is protected from being damaged in the event of the tube being pushed too far into the interior of the second header.

According to yet another preferred feature of the invention, the connecting member is formed by a stamping operation on a substantially flat metal plate, and is itself a substantially flat plate element. In addition, sealing between the reservoir, the second header and the metal connecting member is contained by passing the assembled condenser through an oven in order to effect, for example, brazing or welding between its various elements.

Further features and advantages of the invention will appear more clearly from a reading of the following detailed description of a preferred embodiment of the invention, which is given by way of non-limiting example only and with reference to the accompanying drawings.

BRIEF DESCRIPTION OF THE DRAWINGS

FIG. 2 is a view in longitudinal transverse cross-section of the reservoir and the second header shown in FIG. 1A.

FIG. 3 is a view, in transverse cross-section taken on the axis III—III, of the reservoir and the second header shown in FIGS. 1A and 2.

DESCRIPTION OF A PREFERRED EMBODIMENT OF THE INVENTION

In the whole of this description, the condenser will be considered to be of the "multi-pass" type, and that it forms part of a refrigeration circuit in a motor vehicle air conditioning installation. However, it will be understood that such a condenser can of course be used in other applications, and may be made in different configurations.

Figure 1A:
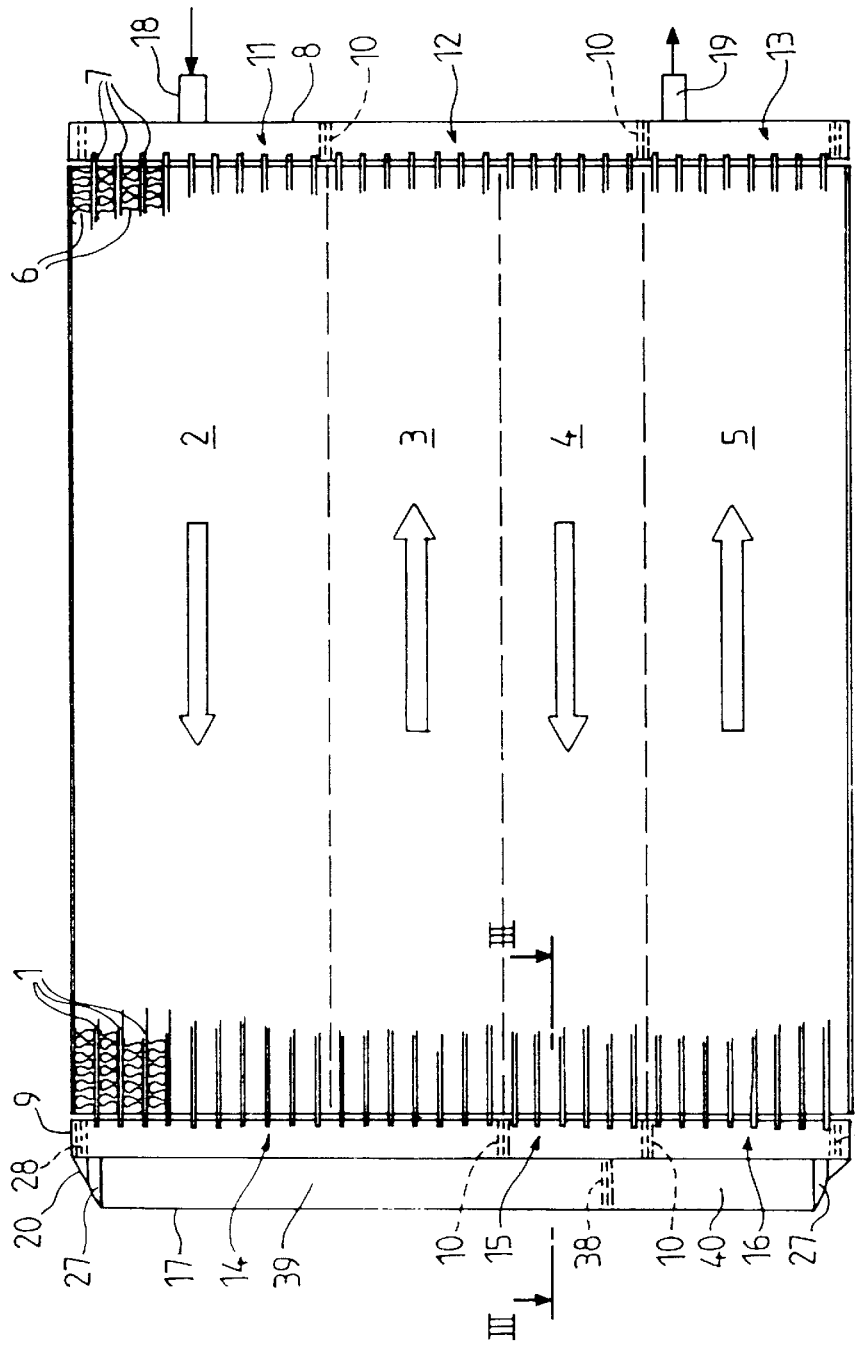
FIG. 1A shows a condenser in accordance with the invention, in side elevation.
Figure 1B:
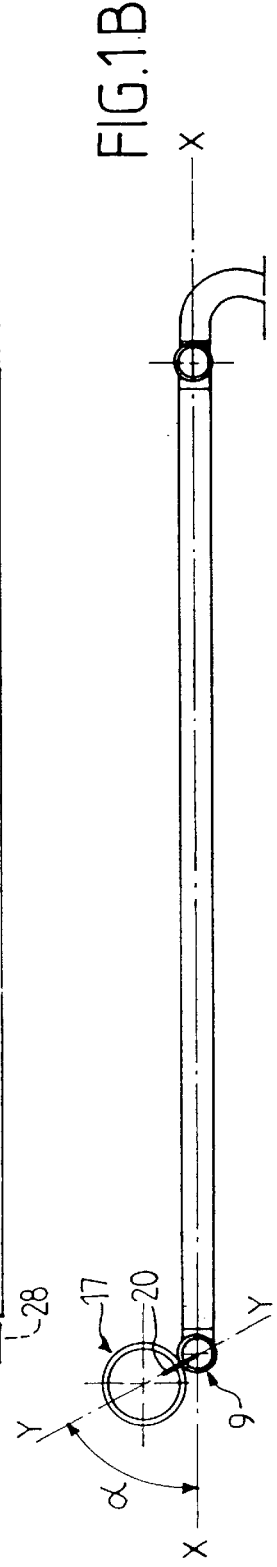
FIG. 1B is a top plan view of the same condenser.

Reference is now made to FIGS. 1A and 1B, so as to describe the flow of refrigerant fluid within a condenser with a separate reservoir.

The condenser shown in the drawings comprises a multiplicity of parallel tubes 1 (only part of which is shown), these tubes constituting a tube bundle which can be subdivided in this example into four sub-groups, namely an upstream sub-group 2, an upper intermediate sub-group 3, a lower intermediate sub-group 4, and a downstream sub-group 5.

The tubes in the bundle are generally horizontal, and are of flat form. The tubes are separated from each other by corrugated cooling fin inserts 6 (only partly shown), the function of which is to assist heat exchange between the refrigerant fluid which flows within the tubes and the air which flows between the tubes.

Each tube 1 has two ends 7, each of which is fitted to a respective one of two generally tubular headers 8 and 9 of the condenser, so that the tubes extend between these headers. The vertical headers 8 and 9 are parallel to each other and substantially perpendicular with respect to the the tubes in the tube bundle.

Each header is sub-divided into chambers by means of partitions 10, to which further reference will be made later in this description. Thus, the first header 8 (which can be manufactured in any appropriate way known to the person skilled in the art) comprises in its upper part a first chamber 11 which is in communication with the upstream sub-group 2 of tubes. In an intermediate part of the header 8, the latter has a second chamber 12 which is in communication with both of the intermediate sub-groups of tubes 3 and 4, while in its lower part the header 8 has a third chamber 13 which is in communication with the downstream sub-group 5.

As to the second header 9, this has a first chamber 14 in its upper part, which is in communication with the upstream sub-group 2 of tubes and also with the upper intermediate sub-group 3, while in an intermediate part of the header 9, the latter has a second chamber 15 which is in communication with the lower intermediate sub-group 4. In a lower part of the header 9 is a third chamber 16 in communication with the downstream sub-group 5. The second header 9 is also in communication with a reservoir 17, firstly through its second chamber 15 and secondly through its third chamber 16.

In FIG. 1A, the arrows indicate the flow of the refrigerant fluid within the condenser. This fluid enters the condenser in a superheated vapour phase, through an inlet pipe connection 18 which is in communication with the first chamber 11 of the first header 8. In order to provide progressive cooling with condensation, the fluid flows in the sub-groups 2, 3 and 4 of the tube bundle, which are in communication with each other through the first chamber 14 of the second header 9 and the second chamber 12 of the first header 8. The refrigerant fluid then passes into the second chamber 15 of the second header 9, and then into an upper part of the reservoir 17, in which it may be suitably treated. The fluid then descends into the lower part of this reservoir in order to reach the third chamber 16 of the second header 9. From there the fluid passes into the downstream sub-group 5, to reach the third chamber 13 of the first header 8, from which it is passed back into the refrigeration circuit via an outlet pipe connection 19.

It should again be emphasised that this particular configuration of multi-pass condenser is in no way limiting, and that many other configurations may be envisaged.

FIG. 1B shows in top plan view the same condenser as is shown in FIG. 1A. In this example, the axis YY of alignment of the reservoir 17 with the second header 9 is offset through an angle α with reference to the axis of alignment XX between the second header 9 and the tubes of the bundle. The angle α is greater than 45 degrees.

Like the headers 9, the reservoir 17 is tubular. More particularly, the reservoir 17 and the second header 9 are of cylindrical tubular form with a circular transverse cross-section, the diameter of the reservoir 17 being considerably greater than that of the second header 9, so as to enable the flow velocity of the refrigerant fluid entering the reservoir 17 to be reduced, and so as also to enable the reservoir to perform its function of carrying a reserve supply of refrigerant fluid. It will of course be understood that the respective diameters of the reservoir 17 and the second header 9 will be chosen according to the requirements of particular applications.

Reference is now made to FIGS. 2 and 3. The reservoir 17 and the second header 9 are fixed to each other by means of a connecting member or connector 20. The reservoir 17 and the second header 9 are defined by vertical walls 21 and 22 respectively. Each of these walls 21 and 22 is made from sheet metal by a blanking-out operation followed by rolling. As shown in the drawings, the respective heights of the reservoir 17 and second header 9 are not necessarily identical. The opposed longitudinal edges of each wall 21 or 22 are substantially parallel to each other and face towards each other without touching. There is therefore a vertical passage or slot 23 over the whole height of the wall 21 and a vertical passage or slot 24 over the whole height of the wall 22. The upper free end 25 and the lower free end 26 of each wall 21 or 22 is arranged to be closed off by means of a metal end closure member, in the form of a plug 27 (on the reservoir 17) or 28 (on the header 9).

Preferably, each end plug 27 of the reservoir 17 is made in a metal plate which is configured in the form of a convex cap, the convex internal face of which is orientated towards the interior of the reservoir. The end plugs 28 of the second header 9 are preferably substantially identical with the intermediate partitions 10 of this header, and are accordingly made from metal plate to dimensions which are substantially identical to the transverse cross-section of the header 9.

The connection between the reservoir 17 and the second header 9 is, as mentioned above, made by the connecting member 20. The latter is press-formed from a metal plate, the height of which is at least equal to the height of whichever one of the reservoir and header is the longer (higher). The connecting plate 20 in this example consists generally of a metal plate having two longitudinal (vertical) edge portions 29 and 30 which are arranged to be introduced into the passages, or slots, 23 and 24, in the walls 21 and 22 of the reservoir 17 and the second header 9 respectively. The thickness of the connector plate 20 is substantially identical to the width of the slots 23 and 24.

The connector plate 20 is formed, at the upper and lower ends of its first longitudinal edge portion 29, with two suitably configured notches or recesses 31 for fitting around and supporting the end plugs 27 of the reservoir 17.

The second longitudinal edge portion 30 of the connector plate 20 is formed with a set of first openings 32 and second openings 33. The intermediate partitions 10 are fitted in the first openings 32. The upper and lower end plugs 28, which close off the upper and lower ends 25 and 26 respectively of the wall 22 of the second header 9 are fitted in the second openings 33. Thus the end plugs, or end partitions, 28 and the intermediate partitions 1 0 are supported respectively by the openings 33 and 32 formed in the second longitudinal edge portion 30 of the plate 20.

It will be realised that with this arrangement, the reservoir 17 and the second header 9 themselves consist of no component other than their walls 21 and 22 respectively, with the end plugs and partitions.

In order to permit flow of the refrigerant fluid between the second header 9 and the reservoir 17, two bights are formed in the connector plate 20, preferably in the second longitudinal edge portion 30 of the latter. The first bight 34 is located in a selected first position or location, between the two intermediate partitions 10 between which the second chamber 15 of the header 9 is defined. These intermediate partitions 10 are fitted in zones which are determined in accordance with the particular configuration of the condenser. The second bight 35 is located in a second selected position or location between the intermediate partition 10 that separates the second chamber 15 of the header 9 from, on the one hand, its third chamber 16 and on the other hand the lower end plug or partition 28 of the header.

The wall 22 of the header 9 is also formed with a number (corresponding with the number of tubes 1) of calibrated slots 36 arranged one above the other. The dimensions of these slots 36 are substantially identical with the outside dimensions of the end portions 7 of the tubes 1 of the condenser. The calibrated slots 36 are formed by stamping before the header wall 22 is formed into its cylindrical configuration. The slots 36 are not in direct facing relationship with the passage 24, so that the tubes which are introduced into the slots, along the axis YY, are inclined with respect to the plane XX in which the connector plate 20 lies. Thus, the second longitudinal edge portion 30 of the connector plate 20 is able to serve as an abutment for the ends 7 of the tubes, which are open into the second header 9 in positions in which the edge portion 30 has no bight or other opening. This arrangement firstly avoids the possibility of most of the tubes being introduced too far into the interior of the header 9, which could damage the tubes and thereby render them at least partially useless, and secondly it protects the internal coating of the internal wall 22.

Preferably, the first longitudinal edge portion 29 of the connector plate 20 also includes, in a selected position, for example in a lower part of the plate, an opening 37 of the same type as the openings 32 and 33 formed in the second longitudinal edge portion 30. An intermediate partition 38 is fitted in and supported by the opening 37 within the reservoir 17. The dimensions of the partition 38 are substantially identical to the transverse cross-section of the reservoir. This partition divides the reservoir 17 into two chambers, namely an upper chamber 39 and a lower chamber 40. The upper chamber 39 can contain desiccating means, and may also contain a filter for removing impurities contained in the refrigerant fluid. After the fluid has been treated in these ways in the upper chamber 39, it is collected in the lower chamber 40. To this end, the intermediate partition 38 has a through hole 41 to enable the refrigerant fluid to flow from the upper chamber 39 into the lower chamber 40. The hole 41 is preferably in a central position in the partition 38.

The condenser described above is preferably assembled in the following way. In a first step, the end partitions 27 are fitted in the opening 31 in the first longitudinal edge portion 29 of the connecting plate 20; the intermediate partition 38 is fitted, where provided, in the opening 37; and the end partitions 28 and intermediate partitions are then fitted in the openings 33 and 32 in the second longitudinal edge portion 30 of the plate 20, respectively.

In a second step of the assembly operation, the first longitudinal edge portion 29 is introduced in vertical sliding movement into the passage 23 in the reservoir wall 21, until the end plugs 27 totally close off the upper end 25 and lower end 26 respectively of the wall 21. Friction between the longitudinal edges of the end plugs 27 and the internal face of the wall 21 then ensures that the connecting number 20 is held fast to the reservoir 17.

In a third step of the assembly operation, the second longitudinal edge portion 30 of the connector 20 is introduced in vertical sliding movement into the passage 24 in the wall 22 of the second header 9, until the end plugs 28 fully close off the upper end 25 and lower end 26, respectively, of the header wall 22. The reservoir wall 21 and header wall 22 are now held fast against each other In the region of their respective passages or slots 23 and 24.

Finally, in a fourth step of the assembly, the ends 7 of the tubes are introduced into the calibrated slots 36 in the header wall 22.

The header 9 is itself secured to the connector 20, preferably by virtue of integral projecting elements 42 of the connector 20, which are arranged at least around the positions that are selected for the openings 32. The parallel external faces of these projecting elements 42 are spaced apart from each other by a distance which is substantially equal to the vertical pitch d between two adjacent slots 36. Thus, the projecting elements 42 around an opening 32 are held by two neighbouring tube ends 7, and this is enough to immobilise the header 9 in relation to the connector 20.

Once the condenser has been assembled, it is fully sealed by passing it through a suitable oven, for example a brazing oven. To this end, the faces of the various metallic components are coated with an appropriate braze metal in the well known way.

The invention leads to a high degree of flexibility in the choice of the relative dimensions of the header and the reservoir associated with it. It also leads to a significant reduction in manufacturing costs, and simplification of the assembly operation of the condenser.

The invention is not limited to the embodiment described above, but it embraces all variations which could be developed by a person skilled in the art within the scope of the claims of this Application. Thus, for example, the respective forms and bights of the reservoir and the second header could be different from those indicated in the drawings. Similarly, the configuration of the condenser can be varied considerably, and consequently so can the positions and the number of intermediate partitions; and the bights could be substantially different from those described and shown in the drawings.

What is claimed is:

1. A condenser for a refrigeration circuit, comprising: a first header; a second header; a tube bundle comprising a multiplicity of tubes mounted between the said first and second headers; and a separate reservoir close to the second header, said headers and reservoir being substantially vertical, the second header comprising a header wall and the reservoir comprising a reservoir wall, the header wall defining a first passage and the header wall defining a second passage, said first and second passages being formed through the respective said walls and extending vertically over the height of the reservoir and second header respectively, the condenser further including a metal connecting member comprising a first longitudinal edge portion and a second longitudinal edge portion defining opposed vertical lateral edges of the connecting member and extending over at least the height of the reservoir and second header respectively, the said first and second edge portions being received in the said first and second passages respectively so as to immobilise the reservoir wall and the header wall against each other in the region of the said passages, the connecting member having, in at least one selected location, a bight in a said edge portion for flow of a refrigerant fluid through the bight between the second header and the reservoir, the said first and second edge portions obturating the first and second passages, respectively, except at the said at least one bight.

2. A condenser according to claim 1, wherein each of the said reservoir wall and header wall is cylindrical, being formed from metal plate and having an upper end and lower end, the reservoir and second header each further including an end closure member closing each of said upper and lower ends.

3. A condenser according to claim 2, wherein each said edge portion of the connecting member has an upper end portion and a lower end portion, each of which defines a lateral opening receiving and supporting a corresponding said end closure member.

4. A condenser according to claim 1, wherein, of the second header and the reservoir, at least the second header further includes an intermediate partition located in at least one predetermined location along the height of the second header, whereby to define a plurality of internal chambers, at least one of the said longitudinal edge portions of the connecting member defining means supporting said at least one intermediate partition.

5. A condenser according to claim 4, wherein the or each said means supporting an intermediate partition is an opening formed in the corresponding said edge portion in the said predetermined location, the corresponding intermediate partition being a metal plate fitted in said opening.

6. A condenser according to claim 1, wherein the or each said bight is formed in the said second longitudinal edge portion.

7. A condenser according to claim 1, wherein the second header further includes two metal intermediate partitions, the said second longitudinal edge portion of the connecting member defining, in each of said predetermined first and second zones, means supporting a respective one of the said intermediate partitions, the said second longitudinal edge portion further defining two said bights in selected first and second locations.

8. A condenser according to claim 4, wherein the end closure members of the second header are metal plate elements are substantially identical to the or each intermediate partition of the second header, the said first longitudinal edge portion of the connecting member having an upper part and a lower part, each defining a first opening receiving, fitted therein, a corresponding said end closure member of the reservoir, each reservoir end closure member being a metallic plate member configured with a convex face oriented towards the interior of the reservoir, and wherein the said second longitudinal edge portion has an upper part and a lower part each defining a respective second opening, each said end closure member of the second header being fitted In a corresponding said second opening.

9. A condenser according to claim 8, wherein the said second longitudinal edge portion defines a first said bight and a second said bight, the second header having two said intermediate partitions in a first and a second said predetermined zone respectively, the first bight being located between the first and second predetermined zones, and the second bight being located in the lower part of the connecting member between one of the said predetermined zones and the lower closure member of the second header.

10. A condenser according to claim 7, wherein the said first longitudinal edge portion of the connecting portion defines, in the predetermined zone intermediate between the said first and second elected locations, a third opening receiving, fitted therein, an intermediate partition dividing the reservoir into two chambers and having a through hole for flow of refrigerant fluid between the said chambers of the reservoir.

11. A condenser according to claim 2, wherein the wall of the second header is formed with a multiplicity of calibrated slots one above the other, each tube of the tube bundle having an end portion received in a corresponding one of the said calibrated slots, the longitudinal second edge portion of the connecting member having an abutment edge which, except where the abutment edge is interrupted by a said bight, serves as an abutment for the ends of the tubes.

12. A condenser according to claim 1, wherein the connecting member is formed by stamping from a substantially flat metal plate.

13. A condenser according to claim 1, wherein the reservoir, the second header and the connecting member are secured sealingly together by a joint selected from the group consisting of brazed joints and welded joints.

14. A condenser according to claim 8, wherein the wall of the second header is formed with a multiplicity of calibrated slots one above the other, each tube of the tube bundle having an end portion received in a corresponding one of the said calibrated slots, the longitudinal second edge portion of the connecting member having an abutment edge which, except where the abutment edge is interrupted by a said bight, serves as an abutment for the ends of the tubes, and wherein the said calibrated slots define a Pitch distance between one slot and the next, at least the said-second longitudinal edge portion further including, on either side of the openings supporting the intermediate partitions of the second header, projecting elements having outer faces, the said outer faces being spaced apart by a distance equal to the said pitch distance.

* * * * *

UNITED STATES PATENT AND TRADEMARK OFFICE
CERTIFICATE OF CORRECTION

PATENT NO.   : 5,946,938
DATED        : September 7, 1999
INVENTOR(S)  : Patrick Balthazard It is certified that error appears in the above-identified patent and that said Letters Patent is hereby corrected as shown below:

In claim 8, col. 8, line 64, please delete "In" and insert therefor -- in --.

In claim 10, col. 9, line 11, please delete "elected" and insert therefore -- selected --.

In claim 14, col. 10, line 16, please delete "Pitch" and insert therefor -- pitch --.

In claim 14, col. 10, line 17, please delete "said-second" and insert therefor -- said second --.

Signed and Sealed this

First Day of February, 2000

Q. TODD DICKINSON

Attest:

Attesting Officer

Acting Commissioner of Patents and Trademarks